United States Patent
Hartley et al.

(10) Patent No.: US 6,963,834 B2
(45) Date of Patent: *Nov. 8, 2005

(54) METHOD OF SPEECH RECOGNITION USING EMPIRICALLY DETERMINED WORD CANDIDATES

(75) Inventors: Matthew W. Hartley, Boynton Beach, FL (US); James R. Lewis, Delray Beach, FL (US); David E. Reich, Jupiter, FL (US)

(73) Assignee: International Business Machines Corporation, Armonk, NY (US)

( * ) Notice: Subject to any disclaimer, the term of this patent is extended or adjusted under 35 U.S.C. 154(b) by 642 days.

This patent is subject to a terminal disclaimer.

(21) Appl. No.: 09/867,197

(22) Filed: May 29, 2001

(65) Prior Publication Data

US 2002/0184016 A1   Dec. 5, 2002

(51) Int. Cl.[7] ............................................. G10L 15/26
(52) U.S. Cl. .................. 704/235; 704/236; 704/240
(58) Field of Search ................................ 704/235, 239, 704/250, 251, 240, 270, 246, 257, 236, 255, 704/278; 455/426.1

(56) References Cited

U.S. PATENT DOCUMENTS

| | | | | |
|---|---|---|---|---|
| 5,649,060 A | * | 7/1997 | Ellozy et al. | 704/278 |
| 5,712,957 A | * | 1/1998 | Waibel et al. | 704/240 |
| 5,855,000 A | * | 12/1998 | Waibel et al. | 704/235 |
| 5,995,928 A | | 11/1999 | Nguyen et al. | 704/251 |
| 6,076,059 A | * | 6/2000 | Glickman et al. | 704/260 |
| 6,125,275 A | * | 9/2000 | Comer et al. | 455/426.1 |
| 6,154,648 A | * | 11/2000 | Comer | 455/426.1 |
| 6,173,266 B1 | * | 1/2001 | Marx et al. | 704/270 |
| 6,182,039 B1 | | 1/2001 | Rigazio et al. | 704/257 |
| 6,185,527 B1 | * | 2/2001 | Petkovic et al. | 704/231 |
| 6,185,530 B1 | * | 2/2001 | Ittycheriah et al. | 704/255 |
| 6,208,965 B1 | | 3/2001 | Brown et al. | 704/246 |
| 6,389,394 B1 | * | 5/2002 | Fanty | 704/249 |
| 6,839,667 B2 | * | 1/2005 | Reich | 704/240 |

* cited by examiner

*Primary Examiner*—Susan McFadden
(74) *Attorney, Agent, or Firm*—Akerman Senterfitt

(57) ABSTRACT

A method for performing speech recognition can include determining a recognition result for received user speech. The recognition result can include recognized text and a corresponding confidence score. The confidence score of the recognition result can correspond to a predetermined minimum threshold. If the confidence score does not exceed the predetermined minimum threshold, the user can be presented with at least one empirically determined alternate word candidate corresponding to the recognition result.

20 Claims, 2 Drawing Sheets

METHOD OF SPEECH RECOGNITION USING EMPIRICALLY DETERMINED WORD CANDIDATES

BACKGROUND OF THE INVENTION

1. Technical Field

This invention relates to the field of speech recognition, and more particularly, to a method of improving speech recognition through the use of empirically determined word candidates.

2. Description of the Related Art

Speech recognition is the process by which an acoustic signal received by microphone is converted to a set of text words, numbers, or symbols by a computer. These recognized words then can be used in a variety of computer software applications for purposes such as document preparation, data entry, and command and control. Improvements to speech recognition systems provide an important way to enhance user productivity.

Speech recognition systems can model and classify acoustic signals to form acoustic models, which are representations of basic linguistic units referred to as phonemes. Upon receiving and digitizing an acoustic speech signal, the speech recognition system can analyze the digitized speech signal, identify a series of acoustic models within the speech signal, and determine a recognition result corresponding to the identified series of acoustic models. Notably, the speech recognition system can determine a measurement reflecting the degree to which the recognition result phonetically matches the digitized speech signal.

Speech recognition systems also can analyze the potential word candidates with reference to a contextual model. This analysis can determine a probability that the recognition result accurately reflects received speech based upon previously recognized words. The speech recognition system can factor subsequently received words into the probability determination as well. The contextual model, often referred to as a language model, can be developed through an analysis of many hours of human speech. Typically, the development of a language model can be domain specific. For example, a language model can be built reflecting language usage within a legal context, a medical context, or for a general user.

The accuracy of speech recognition systems is dependent on a number of factors. One such factor can be the context of a user spoken utterance. In some situations, for example where the user is asked to spell a word, phrase, number, or an alphanumeric string, little contextual information can be available to aid in the recognition process. In these situations, the recognition of individual letters or numbers, as opposed to words, can be particularly difficult because of the reduced contextual references available to the speech recognition system. This can be particularly acute in a spelling context, such as where a user provides the spelling of a name. In other situations, such as a user specifying a password, the characters can be part of a completely random alphanumeric string. In that case, a contextual analysis of previously recognized characters offers little, if any, insight as to subsequent user speech.

Still, situations can arise in which the speech recognition system has little contextual information from which to recognize actual words. For example, when a term of art is spoken by a user, the speech recognition system can lack a suitable contextual model to process such terms. In consequence, once a term of art is encountered, similar to the aforementioned alphanumeric string situation, that term of art provides little insight for predicting subsequent user speech.

Another factor which can affect the recognition accuracy of speech recognition systems can be the quality of an audio signal. Oftentimes, telephony systems use low quality audio signals to represent speech. The use of low quality audio signals within telephony systems can exacerbate the aforementioned problems because a user is likely to provide a password, name, or other alphanumeric string on a character by character basis when interacting with an automated computer-based system over the telephone.

SUMMARY OF THE INVENTION

The invention disclosed herein provides a method for performing speech recognition. In particular, in cases wherein a likelihood exists that a speech recognition result does not accurately reflect a received user spoken utterance, the user can be asked to choose a correct recognition result from one or more empirically determined alternate word candidates. Empirically determined alternate word candidates can be one or more characters, words, or phrases which are determined from an analysis of dictated text as compared to the recognized dictated text from the speech recognition system. For example, the alternate word candidates can be comprised of the recognition results, including incorrect recognition results, determined for a particular user spoken utterance. Thus, rather than informing a user that the last user spoken utterance was not understood, or asking the user to repeat the last utterance, the invention enables a speech recognition system to function in a human-like manner by presenting the user with empirically determined alternate word candidates and asking the user to select a correct recognition result from the alternate word candidates. For example, the speech recognition system can query the user by asking "Did you say 'F' as in 'Frank' or 'S' as in 'Sam'". The invention, however, can be used with regard to words or phrases, as well as characters.

One aspect of the present invention can include a method for performing speech recognition including determining a recognition result for received user speech. The recognition result can include recognized text and a corresponding confidence score. The confidence score can be compared to a predetermined minimum threshold. If the confidence score does not exceed the predetermined minimum threshold, the user can be presented with at least one empirically determined alternate word candidate corresponding to the recognition result. The at least one empirically determined alternate word candidate, which can be phonetically similar or substantially phonetically equivalent to the corresponding recognition result, can be presented in a graphical format or using an audio user interface. Additionally, the alternate word candidates can have a corresponding conditional probability. Notably, the alternate word candidates can have a conditional probability greater than a predetermined threshold.

A user input specifying one of the at least one empirically determined alternate word candidates can be received as a correct recognition result corresponding to the received user speech. The received user speech can specify a character. Also, at least one of the at least one empirically determined alternate word candidates can be a character.

Another embodiment of the invention can include a method for performing speech recognition including determining a recognition result for received user speech specifying a character. The recognition result can include a character interpretation of the user speech and a corresponding confidence score. The confidence score corresponding to the recognition result can be compared to a predetermined minimum threshold. If the confidence score does not exceed the predetermined minimum threshold, the user can be presented with at least one empirically determined alternate character candidate corresponding to the recognition result. The alternate character candidate can have a corresponding conditional probability.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
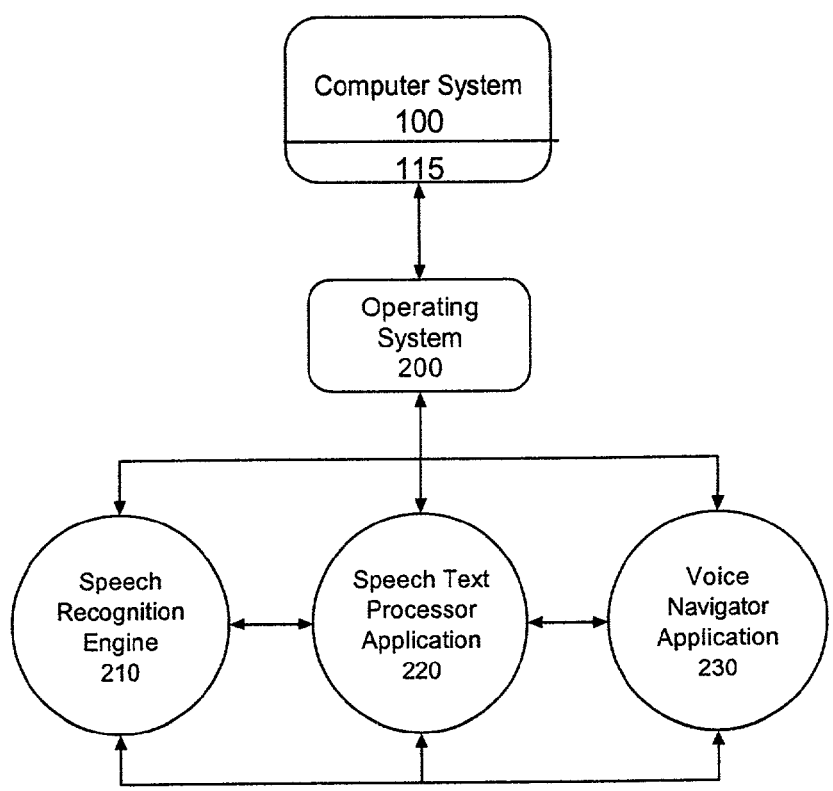
FIG. 1 is a schematic diagram depicting an exemplary architecture for speech recognition in accordance with the inventive arrangements.

The invention disclosed herein provides a method for performing speech recognition. In particular, the invention can determine that a likelihood exists that a recognition result does not accurately reflect received user speech. In other words, the invention can determine that a recognition result for a particular received user spoken utterance is likely an incorrect recognition result. Such determinations can be made using a confidence score generated by the speech recognition system. A confidence score, which is well known in the art, can reflect the likelihood that a particular word candidate or series of word candidates, as determined by the speech recognition system, accurately reflects the corresponding user spoken utterance.

Specifically, in cases where the confidence score is below a predetermined threshold, one or more alternate word candidates, each being a potential accurate recognition result for the received user speech, can be identified. The word candidates, which can be one or more individual characters, words, or phrases, can be empirically determined substitution alternates determined from an analysis of dictated text as compared to the recognized dictated text from the speech recognition system. The speech recognition system can query the user as to which of the potential word candidates is an accurate recognition result for the received user speech. Thus, rather than informing a user that the last user spoken utterance was not understood, or asking the user to repeat the last utterance, the invention enables a speech recognition system to function in a human-like manner by asking the user which candidate is the correct recognition result.

As mentioned, the alternate word candidates can be determined from an empirical analysis of dictated text as compared to the recognized dictated text from the speech recognition system. For example, an empirical analysis can reveal that when the speech recognition system outputs a recognition result of "A", there is an 86% probability that the speech recognition system has correctly recognized the user spoken utterance. The same empirical analysis also can determine a list of probable alternate word candidates based upon a statistical analysis and comparison of recognition results corresponding to received user spoken utterances.

The candidates can be ordered according to a conditional probability associated with each word candidate which can be calculated using statistical processing techniques known in the art. The conditional probability can reflect the likelihood that when the speech recognition system produces a particular recognition result, that result is an accurate reflection of the user spoken utterance. Thus, contrary to a confidence score which can be used during the speech recognition process to effectively "look ahead" to recognize a user spoken utterance, the conditional probability is a measure which "looks back" from the standpoint of a completed recognition result. Specifically, the conditional probability can be a measure of the accuracy of the speech recognition process for a particular recognized character, word, or phrase. Taking the previous example, if an empirical analysis reveals that the speech recognition system is correct 86% of the cases wherein an "A" is determined to be the recognition result, the 86% can be translated into a conditional probability. The conditional probability can be expressed in any of a variety of formats or conventions. For example, the conditional probability can be expressed as a normalized numerical value such as 0.86.

One skilled in the art will recognize that the alternate word candidates can be can be phonetically similar or substantially phonetically equivalent to the recognition result. The alternate word candidates, however, need not be similar to the recognition result. Rather, the candidates can be any character, word, or phrase which has been identified through an empirical analysis of recognition results and dictated text as being an alternate word candidate corresponding to a particular recognizable character, word, or phrase.

Though the invention can be used with words, the invention can be particularly useful in recognizing individual characters such as letters, numbers, and symbols, including international symbols and other character sets. Accordingly, the present invention can be used in the context of a user specifying a character string on a character by character basis. For example, the invention can be used when a user provides a password over a telephone connection. In that case, any previously recognized characters of the password provide little or no information regarding a next character to be received and recognized. Accordingly the language model provides little help to the speech recognition system. For instance, if the user utters the letter "F", the speech recognition system can accurately recognize the user spoken utterance as the letter "F". If the confidence level is not above a predetermined threshold, however, the speech recognition system can present the user with one or more empirically determined alternate word candidates. The candidates can be a predetermined number "N" candidates having the highest "N" conditional probabilities. Thus, the speech recognition system can query the user by asking "Did you say 'F' as in 'Frank' or 'S' as in 'Sam'". In this case, the speech recognition system has asked the user to choose between two alternate word candidates corresponding to the recognition result "F". The prompts can be programmed to include a word that begins with each candidate. In this case "Frank" and "Sam" can be included within an audio prompt wherein "Frank" begins with the word candidate "F"; and, "Sam" begins with the word candidate "S". Thus, the user can respond with the entire phrase "'F' as in 'Frank'", which the speech recognition system can recognize more readily.

A typical computer system can be used in conjunction with the present invention. The system can include a computer having a central processing unit (CPU), one or more memory devices, and associated circuitry. The memory devices can be comprised of an electronic random access memory and a bulk data storage medium. The system also can include a microphone operatively connected to the computer system through suitable interface circuitry, and an optional user interface display unit such as a video data terminal operatively connected thereto. The CPU can be comprised of any suitable microprocessor or other electronic processing unit, as is well known to those skilled in the art. Speakers, as well as interface devices, such as a mouse and a keyboard, can be provided with the system, but are not necessary for operation of the invention as described herein. The various hardware requirements for the computer system as described herein generally can be satisfied by any one of many commercially available high-speed computers.

FIG. 1 is a schematic diagram illustrating a typical architecture for a speech recognition system in a computer system 100 such as the previously described computer system. As shown in FIG. 1, within the memory 115 of computer system 100 can be an operating system 200 and a speech recognition engine 210. Also included can be a speech text processor application 220 and a voice navigator application 230. The invention, however, is not limited in this regard and the speech recognition engine 210 can be used with any other application program which is to be voice enabled. In FIG. 1, the speech recognition engine 210, speech text processor application 220, and the voice navigator application 230 are shown as separate application programs. It should be noted, however, that the invention is not limited in this regard, and these various application programs can be implemented as a single, more complex application program. For example, the speech recognition engine 210 can be combined with the speech text processor application 220 or with any other application to be used in conjunction with the speech recognition engine 210. Also, if no other speech controlled application programs are to be operated in conjunction with the speech text processor application 220 and speech recognition engine 210, the system can be modified to operate without the voice navigator application 230. The voice navigator application 230 primarily helps coordinate the operation of the speech recognition engine 210.

As previously mentioned, the speech recognition engine 210 can include empirically determined alternate word candidates. Specifically, the alternate word candidates can be provided for characters, words, or phrases, which are recognizable by the speech recognition engine 210. Also, the alternate word candidates corresponding to a particular character, word, or phrase, can be prioritized according to the conditional probability which can reflect the likelihood that when the speech recognition system produces a recognition result, that result is an accurate reflection of the user spoken utterance.

In operation, audio signals representative of sound received through a microphone can be processed within computer 100 using conventional computer audio circuitry so as to be made available to the operating system 200 in digitized form. Alternatively, audio signals can be received via a computer communications network from another computer system in analog or digital format or from another transducive device such as a telephone. The audio signals received by the computer system 100 are conventionally provided to the speech recognition engine 210 via the computer operating system 200 in order to perform speech recognition functions. As in conventional speech recognition systems, the audio signals can be processed by the speech recognition engine 210 to identify words spoken by a user into the microphone.

Figure 2:
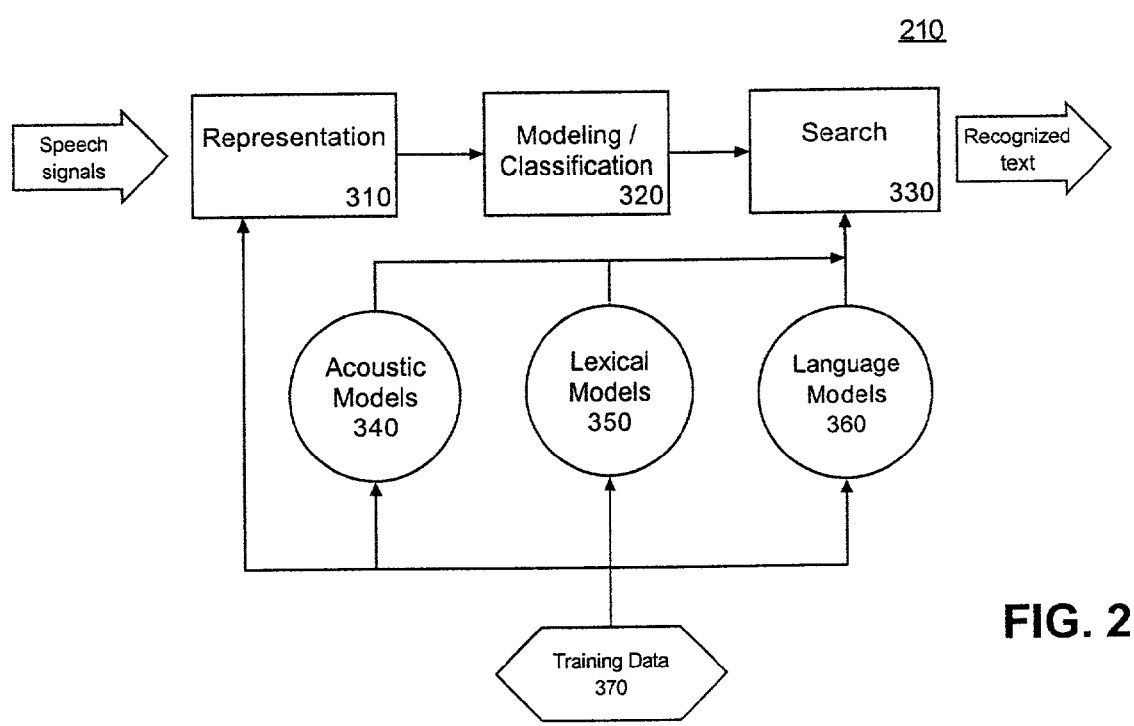
FIG. 2 is a block diagram showing typical components which can comprise a speech recognition engine in accordance with the inventive arrangements.

FIG. 2 is a block diagram showing typical components which can comprise speech recognition engine 210. As shown in FIG. 2 the speech recognition engine 210 receives a digitized speech signal from the operating system. The system is subsequently transformed in representation block 310 into a useful set of data by sampling the signal at some fixed rate, typically every 10–20 msec. The representation block produces a new representation of the audio signal which then can be used in subsequent stages of the voice recognition process to determine the probability that the portion of the wave form just analyzed corresponds to a particular phonetic event. This process is intended to emphasize perceptually important speaker independent features of the speech signals received from the operating system. In modeling/classification block 320, the speech signals are processed further to adapt speaker-independent acoustic models to those of the current speaker. Finally, in search block 330, search algorithms are used to guide the search engine to the most likely words corresponding to the speech signal. The search block 330 occurs with the help of acoustic models 340, lexical models 350, and language models 360.

The invention can utilize a confidence score as part of the recognition process. A confidence score, which is well known in the art, reflects the likelihood that a particular word candidate or series of word candidates, as determined by the speech recognition system, accurately reflects the corresponding user spoken utterance. The confidence score can be a value derived from a comparison of the speech signal to acoustic models, lexical models, and language models using statistical processing techniques known in the art. For example, the confidence score can take into account the likelihood that a particular word candidate or word candidates represent a user spoken utterance as determined using an acoustic model, in addition to the probability that the particular word candidate can be located next to another word or group of words as determined using a language model. It should be appreciated that the confidence score can be expressed in any of a variety of formats or conventions. In one embodiment, the confidence score can be expressed as a normalized numerical value.

Figure 3:
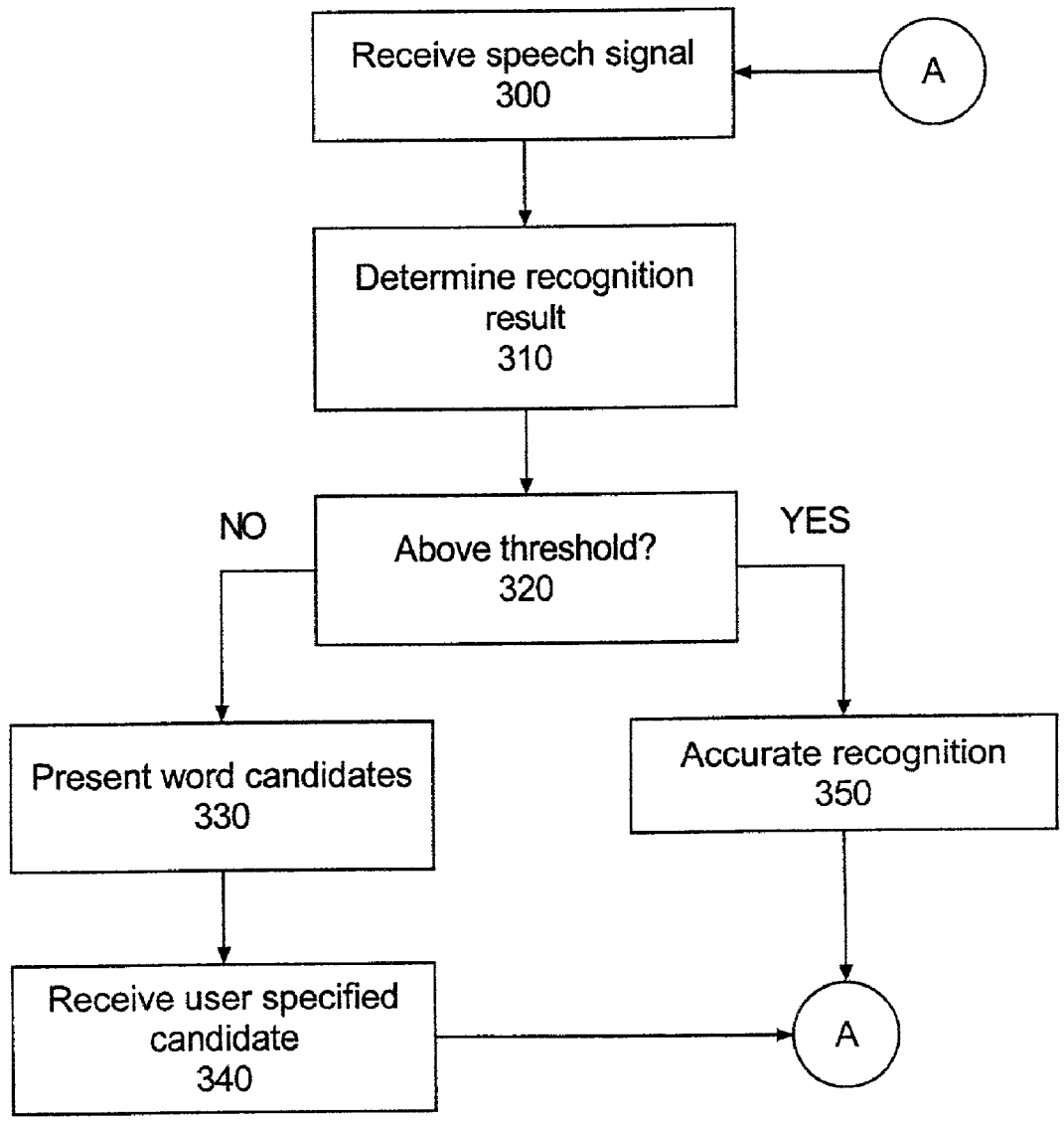
FIG. 3 is a flow chart illustrating an exemplary method of presenting a user with alternate word candidates.

FIG. 3 is a flow chart illustrating an exemplary method for performing speech recognition in accordance with the inventive arrangements. The method illustrated in FIG. 3 can begin in a state wherein a user is providing a user spoken utterance. Consequently, the user utterance can be digitized and provided to the speech recognition system for processing. In step 300, a speech signal can be received. For example, a speech signal representative of a user spoken word such as "F" or "fun" can be received.

In step 310, the speech signal can be processed to determine a recognition result corresponding to the received user spoken utterance. During the speech recognition process, a confidence score can be calculated which corresponds to the recognition result. For example, if the user said "F", the recognition result can be "F" having a confidence score of 0.71. Similarly, if the user said "fun", the recognition result can be "fun" having a confidence score of 0.70. After completion of step 310, the method can continue to step 320.

In step 320, the confidence score of the recognition result can be compared to a minimum threshold value. Accordingly, the confidence score of 0.71 corresponding to the word candidate "F" can be compared to the predetermined threshold. The predetermined threshold can be a programmed or a user adjustable value. In any case, the threshold can represent the minimum confidence score needed to be considered an accurate recognition result by the speech recognition system. Thus, if the confidence score of the recognition result is equal to or above the predetermined threshold, a high likelihood exists that the recognition result is accurate. For example, if the threshold is set to 0.70, the word candidate "F" can be determined to be an accurate recognition result. In that case the method can continue to step 350 where the word candidate "F" can be noted as being an accurate recognition result. The result can be provided to the user or another application program. In any case, the method can proceed to jump circle A and repeat as necessary.

If, however, the confidence score of the recognition result is below the predetermined minimum threshold, an unacceptable likelihood exists that the recognition result is inaccurate. For example, if the predetermined threshold is set to 0.75, the recognition result of "F" having a confidence score of 0.71 can be considered to be inaccurate or have a strong likelihood of being inaccurate. In that case, the method can continue to step 330.

In step 330, the empirically determined word candidates can be presented to the user. Notably, the top "N" word candidates, which can be ordered by the conditional probability, can be presented to the user. It should be appreciated that the value of "N" can be a programmed value or a user adjustable value. In an alternative embodiment, the speech recognition system can use a minimum conditional probability threshold to determine the "N" best word candidates. In that case, if an accurate recognition result has not been determined, any empirically determined word candidate having a conditional probability greater than or equal to the predetermined minimum threshold can be presented to the user. In any case, if no alternate word candidates have a conditional probability above the minimum threshold for conditional probabilities, it can be determined that no viable alternate word candidates exist. Accordingly, no alternate word candidates need be presented to the user; and, the method can end.

The word candidates can be presented to the user in a variety of formats. In one embodiment, the word candidates can be presented as text selections. For example, if the user spoken utterance was "F", the empirically determined word candidates can include "F", "S", or "X". As mentioned, the word candidates can be the top "N" candidates as determined by the conditional probability or each can have a corresponding conditional probability above the predetermined minimum threshold. Thus, within a graphical user interface the user can be asked to specify one of the word candidates "F", "S", or "X" as the correct recognition result. In another embodiment, the word candidates can be presented to the user through an audio user interface, for example utilizing recorded audio or text-to-speech technology, which is known in the art. For instance, if the user speech specified the word "fun", the user can be prompted using an audio prompt to specify one of the word candidates "fun" or "sun" as a correct recognition result. Still, in the case of character recognition using audio prompts, if the user said "f", the user can be prompted as follows: "Did you say 'f' as in 'Frank' or 's' as in 'Sam'".

In another embodiment of the invention, if the confidence score of the recognition result is above the predetermined threshold for an accurate recognition, but still less than or equal to a second predetermined threshold set above the accurate recognition threshold, the speech recognition system still can present the user with one or more alternate word candidates. For example, although a particular word candidate can be determined to be an accurate recognition result, an added check or confirmation can be performed when the confidence score of the recognition result is not significantly higher than the predetermined threshold for determining an accurate recognition. After completion of step 330, the method can proceed to step 340.

In step 340, the user can select the word candidate corresponding to the correct recognition result. The user selection, which can be a speech input, a pointer click or event, or a keyboard entry, can be received and specify the correct recognition result. After completion of step 340, the method can continue to jump circle A and repeat as necessary.

The present invention can be realized in hardware, software, or a combination of hardware and software. In accordance with the inventive arrangements, the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The system disclosed herein can be implemented by a programmer, using commercially available development tools for the particular operating system used. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other specific forms without departing from the spirit or essential attributes thereof, and accordingly reference should be made to the following claims, rather than to the foregoing specification, as indicating the scope of the invention.

What is claimed is:

1. A method for performing speech recognition comprising:
   determining a recognition result for received user speech, said recognition result comprising recognized text and a corresponding confidence score;
   comparing said confidence score corresponding to said recognition result to a predetermined minimum threshold; and
   if said confidence score does not exceed said predetermuied minimum threshold, presenting said user with at least one empirically determined alternale word candidate corresponding to said recognition result.

2. The method of claim 1, further comprising:
   receiving a user input specifying one of said at least one empirically determined alternate word candidates as a correct recognition result corresponding to said received user speech.

3. The method of claim 1, wherein said at least one empirically determined alternate word candidate is phonetically similar to said recognition result.

4. The method of claim 1, wherein said at least one empirically determined alternate word candidate is substantially phonetically equivalent to said recognition result.

5. The method of claim 1, wherein said at least one empirically determined alternate word candidate has a corresponding conditional probability.

6. The method of claim 1, wherein said at least one empirically determined alternate word candidate has a corresponding conditional probability greater than a predetermined threshold.

7. The method of claim 1, wherein said at least one empirically determined alternate word candidate is presented in a graphical format.

8. The method of claim 1, wherein said at least one empirically determined alternate word candidate is presented using an audio user interface.

9. The method of claim 1, wherein said speech specifies a character, and at least one of said at least one empirically determined alternate word candidates is a character.

10. A method for performing speech recognition comprising:
   determining a recognition result for received user speech specifying a character, said recognition result comprising a character interpretation of said user speech and a corresponding confidence score;
   comparing said confidence score corresponding to said recognition result to a predetermined minimum threshold; and
   if said confidence score does not exceed said predetermined minimum threshold, presenting said user with at least one empirically determined alternate character candidate corresponding to said recognition result, said alternate character candidate having a corresponding conditional probability.

11. A machine readable storage, having stored thereon a computer program having a plurality of code sections executable by a machine for causing the machine to perform the steps of:
   determining a recognition result for received user speech, said recognition result comprising recognized text and a corresponding confidence score;
   comparing said confidence score corresponding to said recognition result to a predetermined minimum threshold; and
   if said confidence score does not exceed said predetermined minimum threshold, presenting said user with at least one empirically determined alternate word candidate corresponding to said recognition result.

12. The machine readable storage of claim 11, further comprising:
   receiving a user input specifying one of said at least one empirically determined alternate word candidates as a correct recognition result corresponding to said received user speech.

13. The machine readable storage of claim 11, wherein said at least one empirically determined alternate word candidate is phonetically similar to said recognition result.

14. The machine readable storage of claim 11, wherein said at least one empirically determined alternate word candidate is substantially phonetically equivalent to said recognition result.

15. The machine readable storage of claim 11, wherein said at least one empirically determined alternate word candidate has a corresponding conditional probability.

16. The machine readable storage of claim 11, wherein said at least one empirically determined alternate word candidate has a corresponding conditional probability greater than a predetermined threshold.

17. The machine readable storage of claim 11, wherein said at least one empirically determined alternate word candidate is presented in a graphical format.

18. The machine readable storage of claim 11, wherein said at least one empirically determined alternate word candidate is presented using an audio user interface.

19. The machine readable storage of claim 11, wherein said speech specifies a character, and at least one of said at least one empirically determined alternate word candidates is a character.

20. A machine readable storage, having stored thereon a computer program having a plurality of code sections executable by a machine for causing the machine to perform the steps of:
   determining a recognition result for received user speech specifying a character, said recognition result comprising a character interpretation of said uacr speech and a corresponding confidence score;
   comparing said confidence score corresponding to said recognition result to a predetermined minimum threshold; and
   if said confidence scare does not exceed said predetermined minimum threshold, presenting said user with at least one empirically determined alternate character candidate corresponding to said recognition result.

* * * * *